United States Patent
Nagaralu et al.

(10) Patent No.: US 7,908,302 B1
(45) Date of Patent: Mar. 15, 2011

(54) IN-PLACE SPLITTING AND MERGING OF FILES

(75) Inventors: Sree Hari Nagaralu, Pune (IN); Sunder Phani Kumar, Pune (IN); Anand Apte, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1054 days.

(21) Appl. No.: 10/943,284

(22) Filed: Sep. 17, 2004

(51) Int. Cl.
*G06F 12/00* (2006.01)
*G06F 17/30* (2006.01)

(52) U.S. Cl. ......... 707/821; 707/822; 715/203; 715/229
(58) Field of Classification Search ............. 707/200, 707/205
See application file for complete search history.

(56) References Cited

U.S. PATENT DOCUMENTS

| | | | |
|---|---|---|---|
| 5,454,103 A * | 9/1995 | Coverston et al. | 707/205 |
| 5,701,473 A * | 12/1997 | Braseth et al. | 707/205 |
| 5,802,520 A * | 9/1998 | Jerkunica et al. | 707/101 |
| 5,819,290 A * | 10/1998 | Fujita | 707/2 |
| 5,909,540 A * | 6/1999 | Carter et al. | 714/4 |
| 6,023,744 A * | 2/2000 | Shoroff et al. | 711/4 |
| 6,185,666 B1 * | 2/2001 | Murray et al. | 711/173 |
| 6,427,148 B1 * | 7/2002 | Cossock | 707/7 |
| 6,560,615 B1 * | 5/2003 | Zayas et al. | 707/646 |
| 6,708,166 B1 * | 3/2004 | Dysart et al. | 707/6 |
| 6,801,915 B1 * | 10/2004 | Mack | 707/100 |
| 6,826,582 B1 * | 11/2004 | Chatterjee et al. | 707/205 |
| 6,983,288 B1 * | 1/2006 | Kirkwood et al. | 707/103 R |
| 7,200,626 B1 * | 4/2007 | Hoang et al. | 707/204 |
| 7,234,077 B2 * | 6/2007 | Curran et al. | 714/15 |
| 7,293,033 B1 * | 11/2007 | Tormasov et al. | 707/101 |
| 2003/0182312 A1 * | 9/2003 | Chen et al. | 707/200 |
| 2003/0182313 A1 * | 9/2003 | Federwisch et al. | 707/200 |
| 2003/0182322 A1 * | 9/2003 | Manley et al. | 707/201 |
| 2004/0236798 A1 * | 11/2004 | Srinivasan et al. | 707/200 |
| 2004/0260673 A1 * | 12/2004 | Hitz et al. | 707/1 |
| 2005/0099963 A1 * | 5/2005 | Multer et al. | 370/254 |
| 2005/0152362 A1 * | 7/2005 | Wu | 370/389 |
| 2005/0182989 A1 * | 8/2005 | Zarnke et al. | 714/7 |
| 2005/0204108 A1 * | 9/2005 | Ofek et al. | 711/162 |
| 2006/0259949 A1 * | 11/2006 | Schaefer et al. | 726/1 |

* cited by examiner

*Primary Examiner* — Mohammad Ali
*Assistant Examiner* — Angelica Ruiz
(74) *Attorney, Agent, or Firm* — Campbell Stephenson LLP (57) ABSTRACT

A method, computer program product, and apparatus providing a means to split files and to merge files without the need for duplicating all of the data of the original files is disclosed.

39 Claims, 10 Drawing Sheets

IN-PLACE SPLITTING AND MERGING OF FILES

FIELD OF THE INVENTION

The field of the invention relates generally to operating systems. More particularly, the invention relates to methods and systems for splitting data files into smaller data files without the need for consumption of temporary file space to create a copy of the data file to be copied and techniques for merging split files together.

BACKGROUND OF THE INVENTION

Information drives business. Delays in accessing information can cost a business money and can result in consumption of data center resources that could threaten an organization's productivity. For businesses that increasingly depend on data and information for their day-to-day operations, such delays in data access can hurt a business' reputation and bottom line. Businesses are becoming increasingly aware of these costs and are taking measures to improve their ability to access mission critical data.

Figure 1:
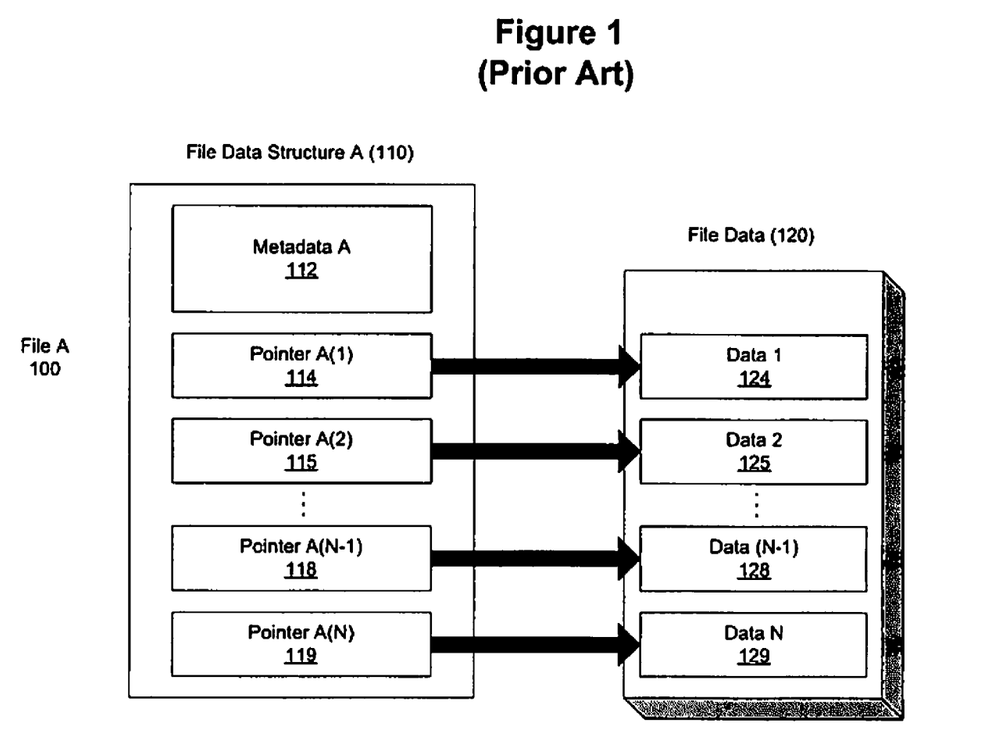
FIG. 1 is a block diagram illustrating a file structure, including a file descriptor such as an inode.

Many complex business applications, such as database management systems, rely upon large stores of data resident on file storage devices. Often, such large stores of data can be found in a small number of very large files. An example of such a file is illustrated in FIG. 1. As a file expands, it is often the case that certain portions of the file are accessed more frequently than others. (For example, the data found in data blocks 125 and 128 may be accessed more than the data found in the other blocks of File Data 120.) However, the size of the file can affect business applications' time of access to those heavily accessed sections of the file. In order to improve performance, it may be desirable to split the large file into smaller portions corresponding with frequently-accessed and infrequently-accessed data. Access to frequently accessed portions of the data can be further improved by causing the corresponding split files to reside on data media that is designed for fast accessibility (e.g., disk drives with fast seek times).

Figure 2A:
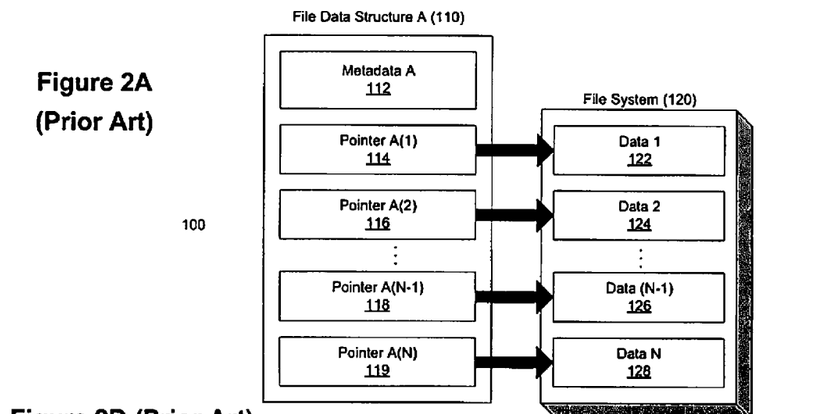
FIGS. 2A, 2B, and 2C are block diagrams illustrating a conventional file splitting method.
Figure 2B:
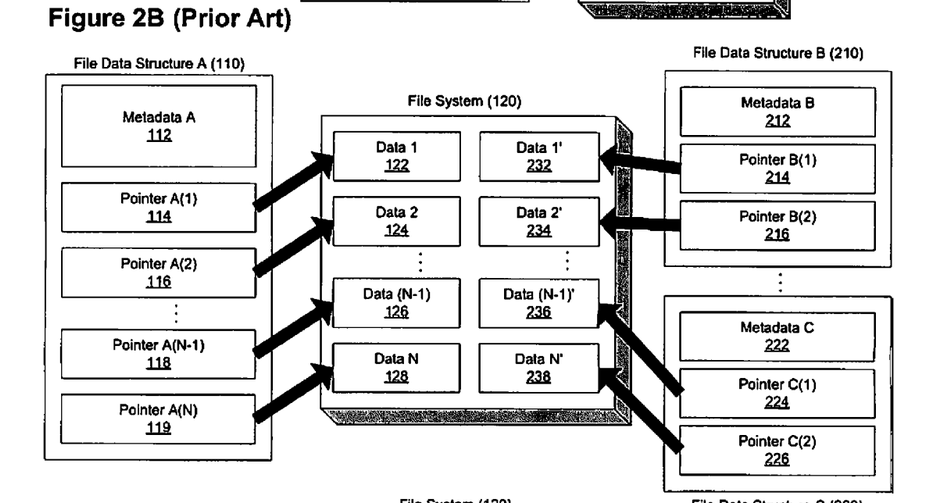
Figure 2C:
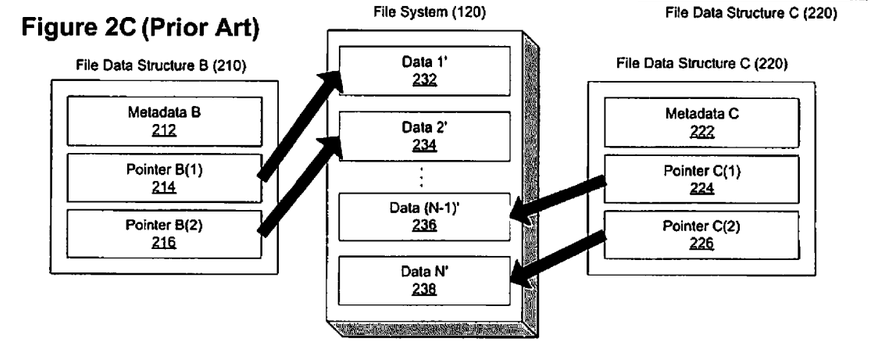

A conventional method of file splitting is illustrated in FIGS. 2A-2C. FIG. 2A shows the structure of a file 100. File 100 can be thought of as consisting of two parts: a file data structure (110) and data resident on the file system (120). A common file data structure is called an inode. Typically, an inode contains metadata describing file characteristics and pointers pointing to the beginning of blocks of data stored on the file system. Metadata can include information such as a file's creation date, a modification date, owners of the file, and access permissions for the file.

FIG. 2B illustrates an intermediate step of conventional methods of file splitting. A set of new files is created to contain the split data. Creation of new files involves creating new File Data Structures (210, 220) for the split files, as well as creating a duplicate (232-238) of all of the original file data (122-128).

Once the new file data structures and data have been duplicated and checked, then the original inode and original data can be deleted as shown in FIG. 2C. But the intermediate step of duplicating the original data can require a large amount of file memory space especially in the case where the original file is large. In order to duplicate that data, file memory space must be available on the accessible storage devices. Maintaining such additional storage capacity, or the effort entailed in removing other files to create such capacity, can be wasteful of a business' resources and money. Further, duplicating data requires significant time during which the source data may not be accessible to users or applications. Such time losses will be emphasized for very large files.

What is therefore needed is a file splitting solution that avoids the necessity of creating a temporary duplicate of the original data. Such a solution would conserve not only the file memory space, but also any time involved in duplicating data.

SUMMARY OF THE INVENTION

The present invention presents a method, system, and apparatus that provide a means to split files and to merge files without the need for duplicating all of the data of the original files. This is accomplished, in part, by creating new file data structures, such as inodes, that contain new file descriptors (i.e., metadata) and pointers that point to the already existing data on the storage device, either directly or indirectly by pointing to appropriate pointers in the original file data structure.

Accordingly, one aspect of the present invention provides a method for creating a first and second new file data structure and coupling those data structures to first and second data storage blocks of an original file. The original file comprises data written to the first and second data storage blocks on a file system memory space and an original file data structure. The first data structure is coupled to the first data storage block of the original file by generating a first pointer to the first file data storage block of the original file and including that first pointer in the first new file data structure. Alternatively, the first data structure is coupled to the first data storage block of the original file by generating an offset pointer to a pointer to the first data storage block, wherein the pointer to the first data storage block is within the original file data structure, and including that offset pointer in the first new file data structure.

Another aspect of the present invention provides a computer program product comprising signal bearing media bearing programming adapted to create a first and second new file data structure and coupling those data structures to first and second file data storage blocks of an original file. The original file comprises data written to the first and second file data storage blocks on a file system memory space and an original file data structure.

A further aspect of the present invention provides an apparatus comprising a means for creating a first and second new file data structure and a means for coupling those data structures to respective first and second file data storage blocks of an original file. The original file comprises data written to the first and second file data storage blocks located on a file system memory space and an original file data structure.

Another aspect of the present invention provides a method for creating a merge file data structure and coupling that merge file data structure to first and second file data storage blocks of respective first and second files. The first and second files respectively comprise first and second file data storage blocks on a file system memory space and respective first and second file data structures.

A further aspect of the present invention provides a computer program product comprising signal bearing media bearing programming adapted to create a merge file data structure and coupling that merge file data structure to first and second file data storage blocks of respective first and second files. The first and second files respectively comprise first and second file data storage blocks on a file system memory space and respective first and second file data structures.

Another aspect of the present invention provides an apparatus comprising means for creating a merge file data structure and means for coupling that merge file data structure to first and second file data storage blocks of respective first and second files. The first and second files respectively comprise first and second file data storage blocks on a file system memory space and respective first and second file data structures.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The present invention provides a means for a user to split an original data file in such a manner that some or all of the data associated with the original data file does not get duplicated during the process. This is done by first deciding how many smaller files into which it is desired to split the original data file, and then creating that number of new file data structures on the file system. Once those new file data structures are created, they can then be coupled with the desired sections of the data associated with the original data file or the original file's file data structure. Once that coupling has been accomplished, entries can be created in a directory corresponding to each of the new file data structures, and then a directory entry corresponding to the original file data structure can be removed from the directory. A directory listing will then show file names associated with the new data structures, but not a listing of the file name associated with the old data structure.

In order to accomplish this result, the original file's data structure may either be retained or deleted. In one embodiment of the present invention, if the original file data structure is retained, new file data structures can be coupled to the data associated with the original file by referencing pointers in the original file data structure. FIG. 5B, which will be more fully described below, illustrates such a "soft split." In the present invention, if the original file data structure is deleted, the new file data structures are coupled to the data associated with the original file using pointers that point to the associated data structures. FIG. 3C, which will be more fully described below, illustrates such a "hard split."

The present invention contemplates a file system in which files are structured in two parts. One part is the actual data associated with the file. The actual file data is stored in blocks or extents on disks or volumes of storage. The second part of the file is a file data structure that contains data about the file and a set of pointers to the datablocks or extents on the storage disks or volumes.

FIG. 1 illustrates an exemplary file configuration that can be used with the present invention. The file data structure (110) contains "metadata" 112, which is information about the file, and a series of pointers (114, 115, 118, 119). Pointer A(1)(114) points to Data 1 (124), which is a block or extent of data on the disk on file system memory space 120. Likewise, Pointer A(2) is associated with Data 2, and so on to Pointer A(N) being associated with Data N. Metadata can contain information such as the date of creation of the file, date of last modification of the file, file ownership information, and file access permissions. A structure like 110 can be found in, for example, the Unix family of operating systems where a file data structure is called an inode. It should be understood that the present invention is not limited to use with inodes or operating systems using inodes, and may be used in association with any file system that uses a file data structure in association with data stored on a disk or file volume.

Hard Split Operation

Figure 3A:
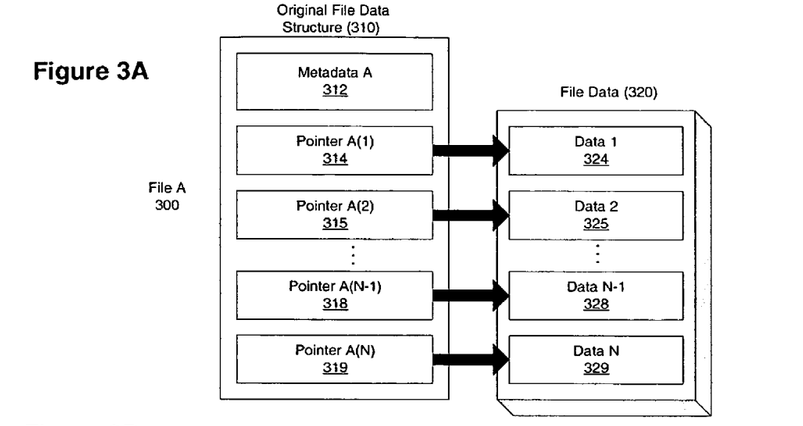
FIGS. 3A, 3B, and 3C are block diagrams illustrating a splitting technique as contemplated by an embodiment of the present invention.
Figure 3B:
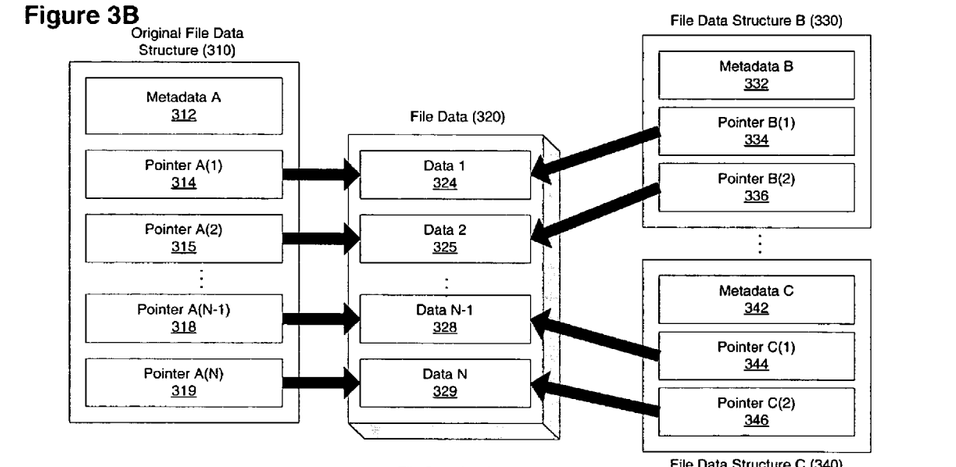
Figure 3C:
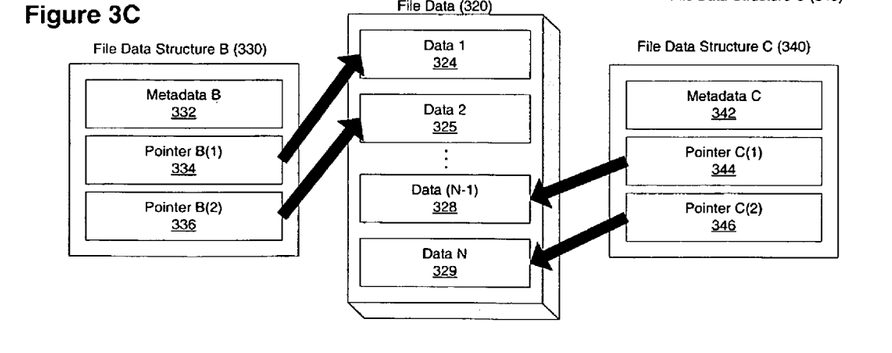

FIGS. 3A, 3B and 3C illustrate the starting, intermediate, and final stages of performing a hard split operation in accord with one embodiment of the present invention. FIG. 3A shows an original File A (300). File A has an original file data structure 310, with metadata A (312), and pointers (314, 315, 318, 319) pointing to file data blocks or extents (324, 325, 328, 329) that comprise file data 320.

FIG. 3B illustrates an intermediate stage of a hard split. During a hard split, new file data structures (330, 340) are created. Portions of original file data structure metadata (312) are copied to new file data structures' metadata (332, 342). Metadata that can be excluded from copying can be information that will not be the same for new files associated with the new file data structures, such as file size. In addition, pointers within the new file data structures are associated with the file data (i.e., blocks of data 324, 325, 328, 329) stored in the file system. Such an association can be done by making reference to pointers (314, 315, 318, 319) in the original file data structure to locate the data blocks or extents, and including the location information in the new file data structures. The number of new file data structures, and the choice of the portions of the file data 320 associated with each file data structure, can be selected by the user in accord with the needs of the application referencing the file data.

FIG. 3C shows the final stage of a hard split. Once the new file data structures have been created and associated with the corresponding file data, the original file data structure (e.g., original file data structure 310) may be removed from the system. Such a removal can include removing an entry corresponding to the file data structure from a directory structure, and deleting the file data structure itself. FIG. 3C shows a result of a hard split with only new file data structures 330 and 340 remaining to be associated with file data 320. Directory entries corresponding to the new file data structures can be created so that upon conducting a directory listing a user or application would find file names corresponding to the new data structures and no file name corresponding to the old data structure. Once the data has been split in this manner, a user or application can manipulate the files (that is, the new file data structures and their corresponding data) in any fashion desired, including migrating the data to faster or slower storage depending upon access needs.

Figure 4:
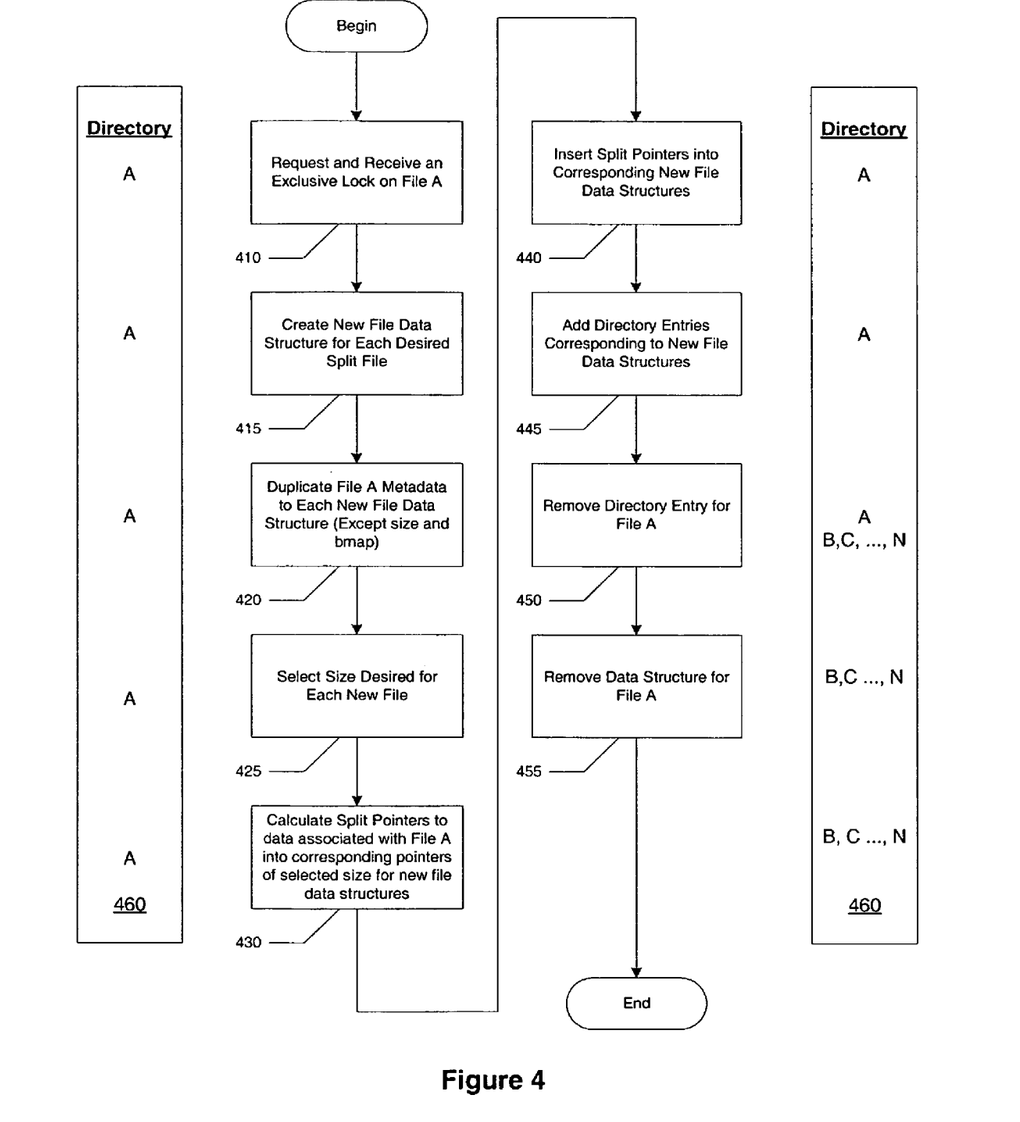
FIG. 4 is a flowchart of the actions taken in effecting a hard split of a file in accordance with an embodiment of the present invention.

FIG. 4 demonstrates actions that are performed in one embodiment of a hard split process of the present invention. Initially, a user or application will request and receive an exclusive lock on a File A (410) to prevent any other user or application from accessing File A during the split operation. Once an exclusive lock is acquired, the user or application can determine how many split files are desired and then create a new file data structure for each desired split file (415). Once the new data structures are created, metadata from the File A data structure can be duplicated into each new file data structure (420). Such metadata information that can be included is information such as creation date, date of last modification, ownership information, and access permissions for File A. The user or application can then determine what size is desired for each split file (425). This determination can be made in light of the needs of the particular application or limitations presented by availability of resources. A calculation is then made to determine appropriate split pointers to data associated with File A based upon the selected size for the new file (430). Those split pointers are included into the new file data structures (440). At this point, the existing structures resemble those shown in FIG. 3B.

Up until step 440, if a user requested a directory listing they would only see reference to the name of File A (as shown in 460). The new file data structures are ready to have directory entries added corresponding to them (445). Should a directory listing be done after this operation one would see a listing of the name of File A, as well as all the filenames associated with the new file data structures. In order to avoid possible confusion at this point, the user or application can request an exclusive lock on the directory in which File A is associated. The directory entry for the filename of File A can now be removed (450) and the original data structure can be removed from the system (455). A directory listing at this point will only show the file names associated with the new file data structures.

Soft Split Operation

Figure 5A:
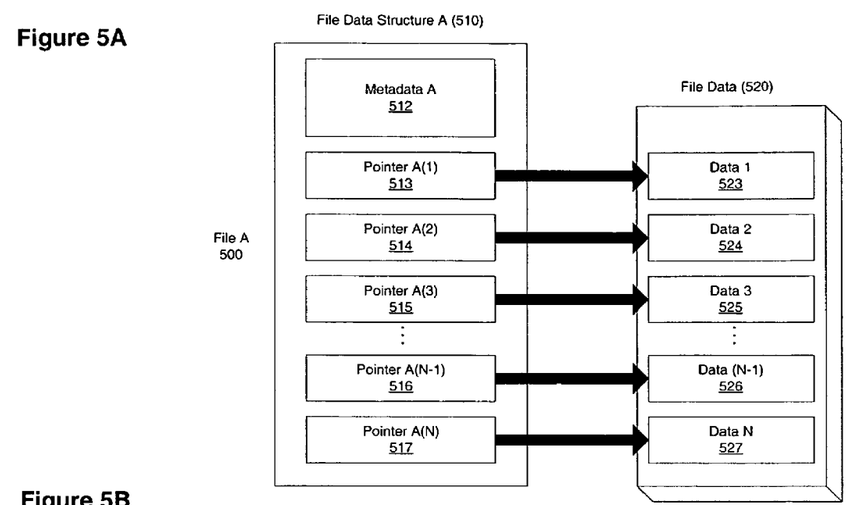
FIGS. 5A and 5B are block diagrams illustrating a splitting technique as contemplated by one embodiment of the present invention.
Figure 5B:
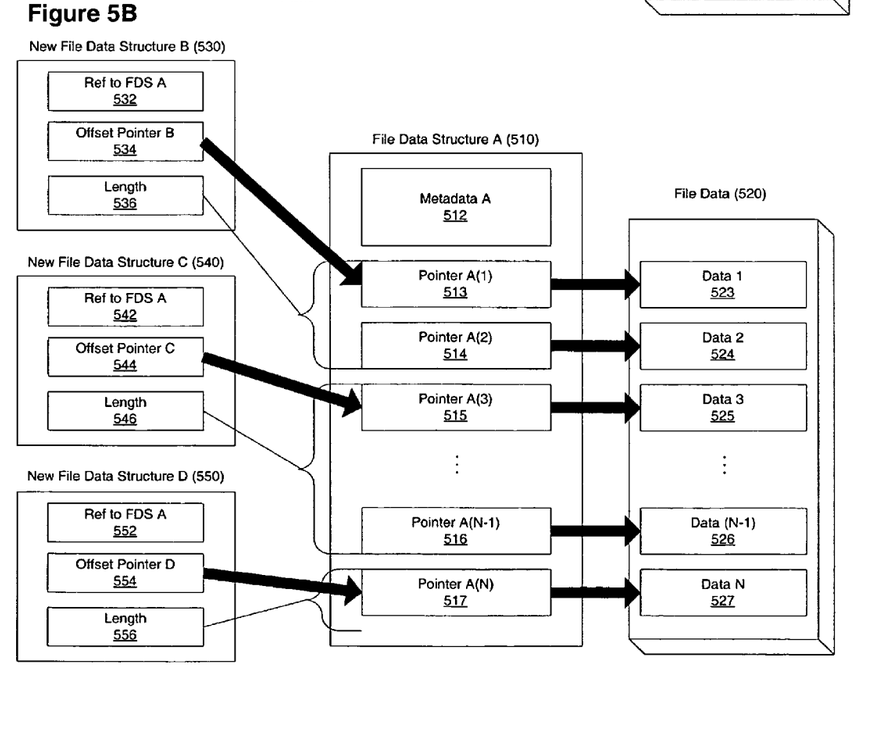

FIGS. 5A and 5B respectively illustrate the before and after conditions when effecting a "soft split." FIG. 5A illustrates a File A (500) comprised of a file data structure A (510) (e.g., an inode) and file data (520) (e.g., blocks or extents located on a file storage device). As discussed previously with regard to FIG. 1, the file data structure may include metadata (512) and pointers to the data blocks or extents (513, 514, 515, 516, 517).

FIG. 5B illustrates the end result of a soft split. In a soft split, new file data structures (530, 540, 550) are created and contain pointers (534, 544, 554) to selected data pointers within original file data structure 510. For example, new file data structure 530 contains an offset pointer B (534) that points to pointer A(1) (513) in the original file data structure. New file data structure 530 also contains, in place of standard metadata, a reference 532 to an identifier of original file data structure. In an inode-based file system, such a reference can be the inode number, which is a unique identifier of the original inode. The new file data structure can also contain a length field, which, as shown in FIG. 5B, determines a number of consecutive pointers in the original file data structure corresponding to data selected to be associated with a new file data structure (for example, length field 536 indicates that two pointers (513, 514) in the original file data structure are associated with pointer 534 in new file data structure 530). Similarly, new file data structure 540 contains a reference to the original file data structure 542, and offset pointer C (544) pointing to the first pointer of data to be associated with this new file data structure (515), and a length field 546 that indicates that pointers 515 to 516 in the original file data structure are to be associated with new file data structure 540. This same process can be repeated for all new file data structures.

Once the new file data structures have been created and associated with the pointers in the original file data structure, directory listings can be created for the new file data structures. Access to the data associated with each new file data structure can then be had by making reference to file names corresponding with the new file data structures. For example, a reference to a file name corresponding to new file data structure 540 may result in a reference from offset pointer C (544) to original file data structure pointer A(3) (515), which points to Data 3 (525). That is, a user or application opening a filename associated with new file data structure C (540) may begin referencing data stored at block or extent 525. That user or application will be able to read data of new file data structure 540 to the extent limited by the length field 546. To illustrate, length 546 and offset pointer 544 indicate that new file data structure 540 corresponds to pointers A(3) through A(N-1) (515-516), inclusive, of original file data structure 510. Thus, a user will only be able to access data in extents or blocks of data 3 through N-1 (525-526), which correspond to pointers A(3) through A(N-1), respectively.

Figure 6:
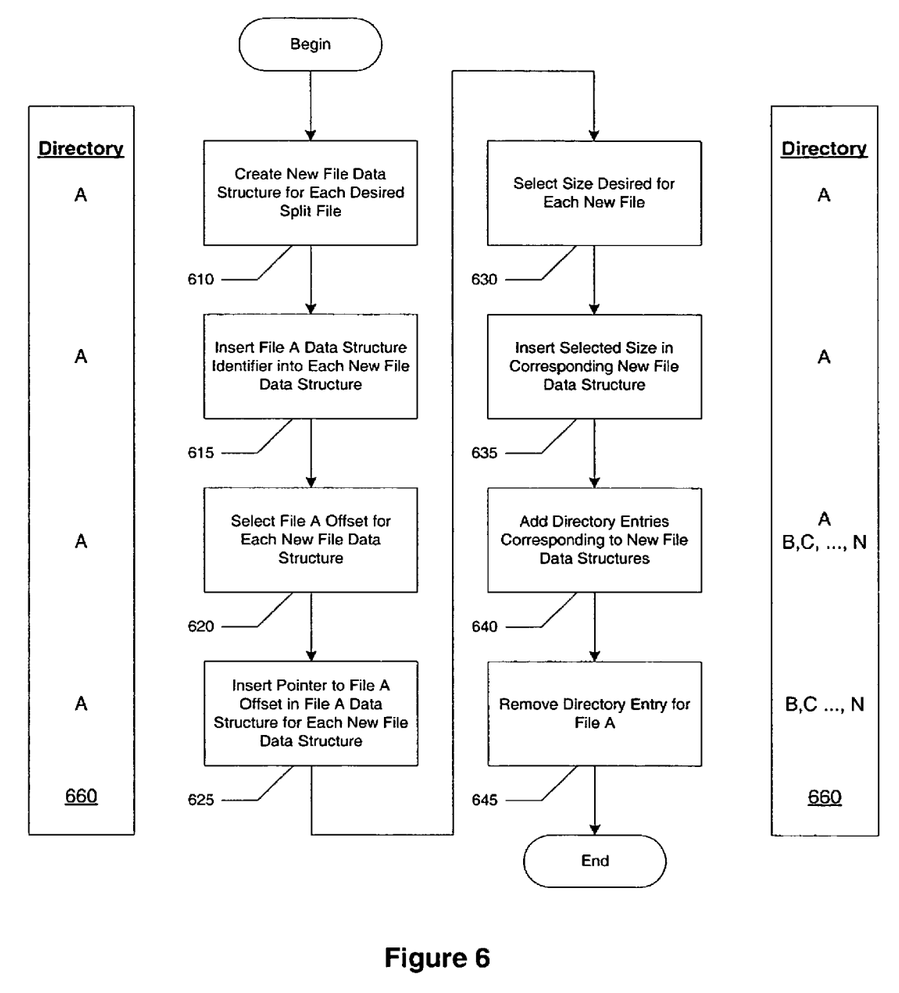
FIG. 6 is a flowchart of the actions taken in effecting a soft split of a file in accordance with one embodiment of the present invention.

FIG. 6 is a flow diagram further illustrating the steps involved in a soft split operation. A user or application desiring to do a soft split can first create new file data structures for each desired split file (610). A file data structure identifier related to the original file data structure (e.g., the inode number corresponding to the original inode) can then be inserted into each new file data structure (615). The user or application can then decide how much of the original file data should be associated with each new file data structure, and then determine the offset to the pointers associated with that data in the original file data structure (620) associated with that data. Once the offset has been determined, then the pointer to the offset in the original file data structure can be inserted into each new file data structure (625). The size or number of pointers to be associated with each new file data structure can then be selected (630) and that size can be inserted into the corresponding new file data structure (635) as the length.

Up to this point, a user conducting a directory listing for files associated with the file data would only find a listing of the filename associated with the original file data structure. For example, if the filename associated with the original file data structure is "A" then a directory listing would only show A (660). Now that the new file data structures have all their necessary information, the user or application can add directory entries corresponding to the new file data structures (640). A directory listing taken at this point would show the filename associated with the original file data structure, as well as filenames associated with each of the new file data structures (illustrated as B, C, . . . , N at 660). Once the new filenames have been entered into the directory listing, the directory entry for the filename associated with the original file data structure can be removed from the directory (645). It is important to note, that in a soft split operation, original file data structure 510 is not removed from the system. The original file data structure is retained because the new file data structures reference the datablocks or extents by making reference to the pointers in the original file data structure.

Merging Files

There may be occasions when it is desirable for a set of files to be merged into a single file, such as reversing a split operation. Such a merge operation can be accomplished after either a soft split, a hard split operation, or even when the files were not originally split.

Figure 7A:
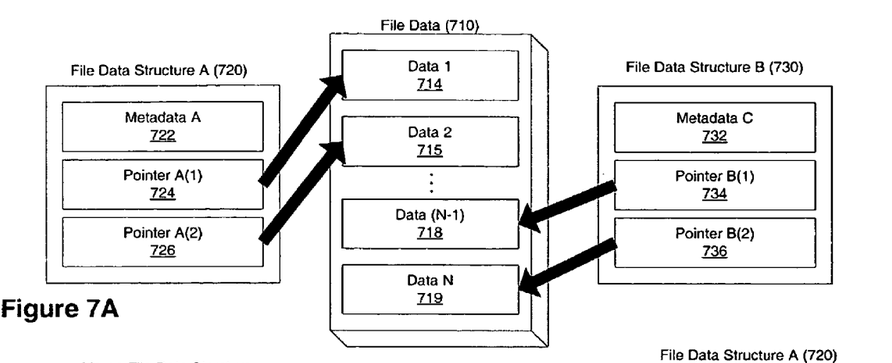
FIGS. 7A, 7B, and 7C are block diagrams illustrating a merge technique as contemplated by one embodiment of the present invention.
Figure 7B:
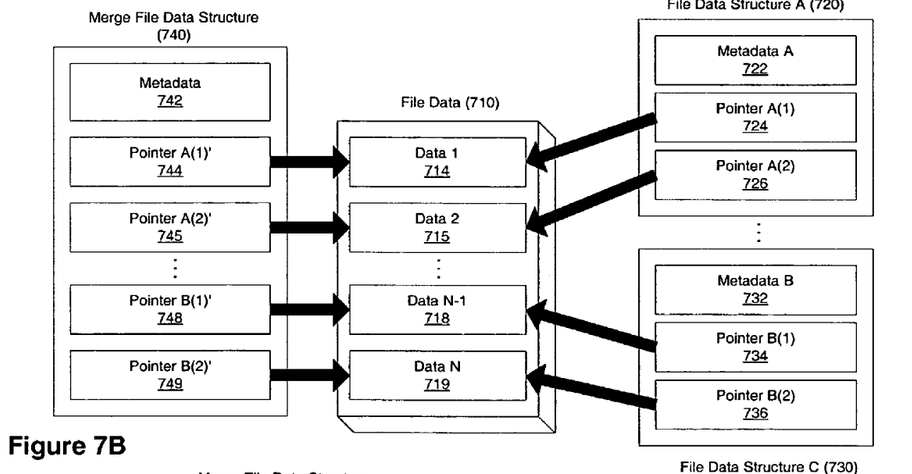
Figure 7C:
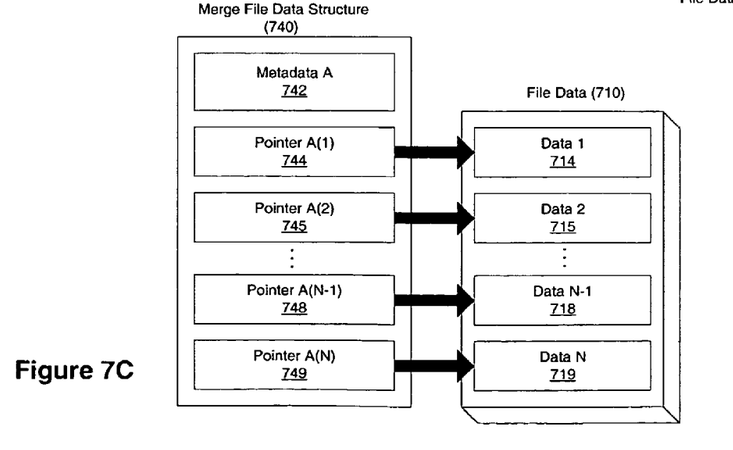

FIGS. 7A-7C illustrate the effects of a merge operation. FIG. 7A shows that File Data Structures A and B (720, 730) contain metadata (722, 732) and pointers (724, 726, 734, 736) to file data (714, 715, 718, 719). If it is desired to merge File Data Structures A and B, a Merge File Data Structure 740 can be created as shown in FIG. 7B. Merge File Data Structure 740 can contain metadata describing the merge file as well as a new set of pointers 744-749 that point to the same file data as that referenced by the pointers in File Data Structures A and B. Once Merge File Data Structure 740 is complete, File Data Structures A and B can be removed from the system and file data (710) can be accessed through Merge File Data Structure 740, as shown in FIG. 7C.

Figure 8:
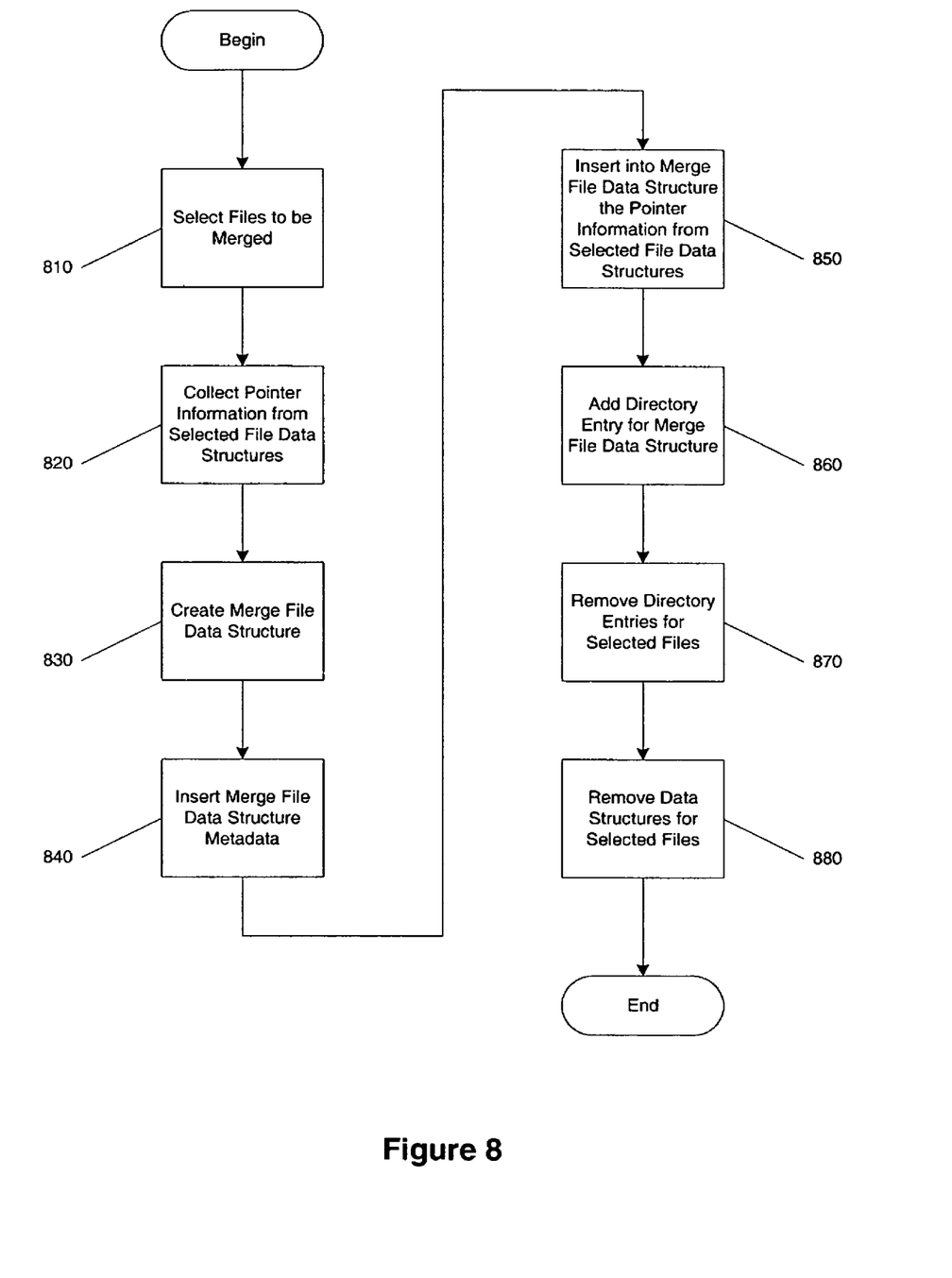
FIG. 8 is a flowchart of the actions taken in effecting a merge of several files in accordance with one embodiment of the present invention.

FIG. 8 presents a flow diagram illustrating a merge process as contemplated by one embodiment of the present invention. Initially, a user or application can select the files desired to be merged (810). The pointer information from the data structures for those selected files is then collected (820). A merge file data structure can be created (830) and metadata can be inserted into the merge file data structure (840) along with the collected pointer information from the selected data structures (850). Alternatively, one could use one of the selected file data structures as the merge file data structure, inserting the pointer information from the other selected file data structures into the merge file data structure and modifying the metadata as needed (not shown). Once the merge file data structure has been completed, a directory entry for the merge file data structure can be added to the file system (860). The directory entries for the selected file data structures can be removed from the system (870) and the selected file data structures themselves can also be removed (880). A merge process such as that illustrated in FIG. 8 can be used for files that have been created in a hard split operation or which were not created from a split operation.

In another embodiment, a merge after a soft split reverses the operation diagrammed in FIGS. 5A and 5B. Since original file data structure 510 is retained in the file system, a merge operation involves re-creating a directory entry in the file system for the original file data structure. Once such a directory entry is created, the directory entries for the filenames associated with the new file data structures (530, 540, 550) are removed from the directory. At this point, users and applications can access data 523-527 by referring to original file data structure 510. The new file data structures (530, 540, 550) can then be deleted from the file system.

As shown above, the present invention can be implemented using a variety of computer systems and networks. An example of one such computing and network environment is described below with reference to FIGS. 9 and 10.

An Example Computing and Network Environment

Figure 9:
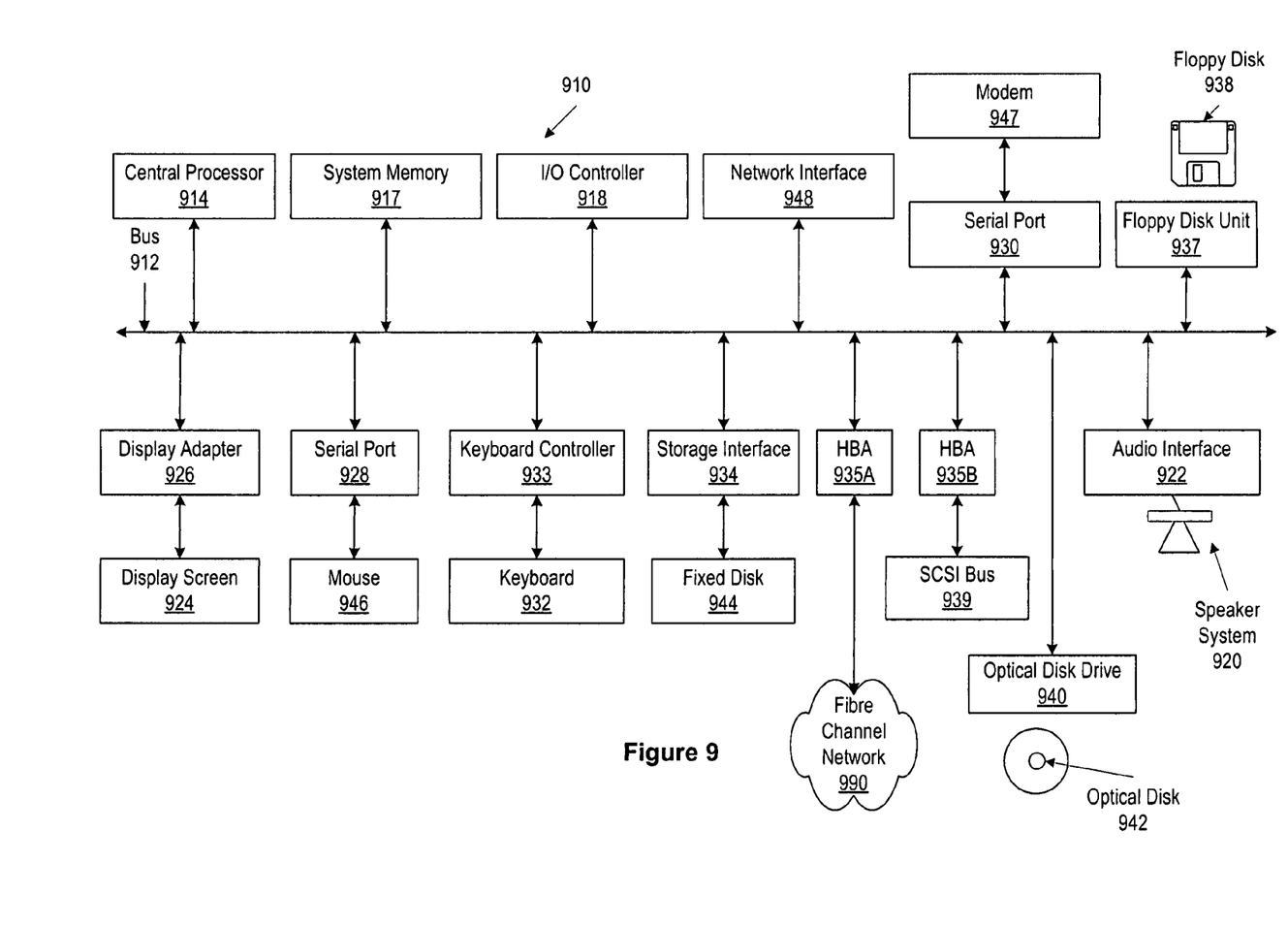
FIG. 9 is a block diagram illustrating a computer system suitable for implementing one or more embodiments of the present invention.

FIG. 9 depicts a block diagram of a computer system 910 suitable for implementing the present invention. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a fibre channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 9 need not be present to practice the present invention. The devices and subsystems can be interconnected in different ways from that shown in FIG. 9. The operation of a computer system such as that shown in FIG. 9 is readily known in the art and is not discussed in detail in this application. Code to implement the present invention can be stored in computer-readable storage media such as one or more of system memory 917, fixed disk 944, optical disk 942, or floppy disk 938. Additionally, computer system 910 can be any kind of computing device, and so includes personal data assistants (PDAs), network appliance, X-window terminal or other such computing devices. The operating system provided on computer system 910 may be MS-DOS®, MS-WINDOWS®, OS/2®, UNIX®, Linux®, or another known operating system. Computer system 910 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
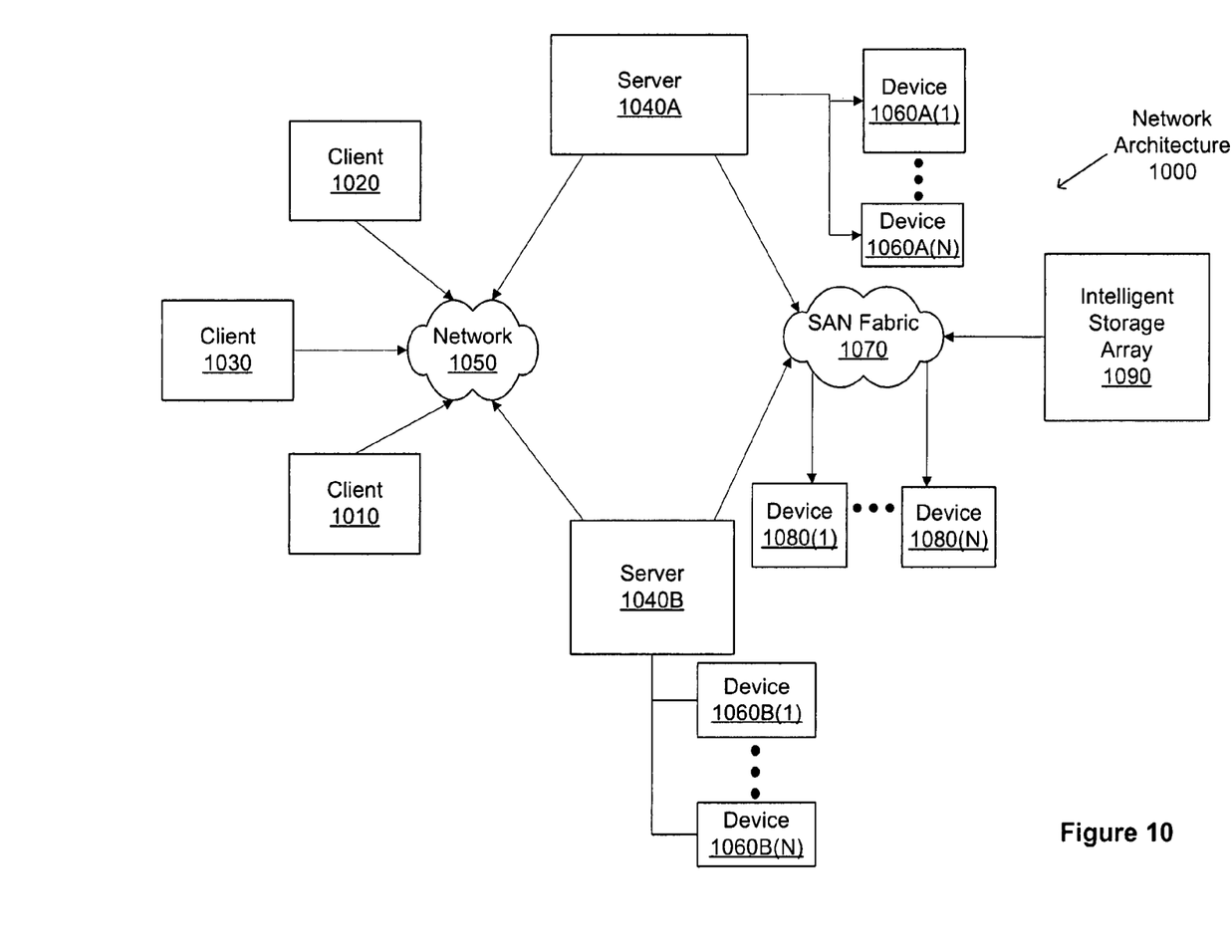
FIG. 10 is a block diagram illustrating a network environment suitable for implementing one or more embodiments of the present invention.

FIG. 10 is a block diagram depicting a network architecture 1000 in which client systems 1010, 1020 and 1030, as well as storage servers 1040A and 1040B (any of which can be implemented using computer system 910), are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the invention. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method comprising:
splitting an original file comprising first and second file data storage blocks, said splitting comprising:
creating a first new file data structure corresponding to a first new file and a second new file data structure corresponding to a second new file, wherein the first new file data structure comprises a plurality of pointers to respective file data storage blocks of the original file, coupling the first and second new file data structures to the respective first and second file data storage blocks of the original file, wherein the first and second file data storage blocks are not replicated during said coupling, and the original file comprises the original file data structure and data written to the first and second file data storage blocks on a file system memory space, generating a first pointer of the plurality of pointers to the first file data storage block of the original file, and storing the first and second new files on a memory device managed by a file system, wherein the creating, the coupling, and the storing are performed by a processor implementing the file system; and merging the first and second new file data structures, wherein the merging comprises:

coupling a merge file data structure to the first and second file data storage blocks, generating a first merge pointer to the first file data storage block, generating a second merge pointer to the second file data storage block, and including the first and second merge pointers in the merge file data structure.

2. The computer-implemented method of claim 1 further comprising:

copying metadata from the original file data structure to the first new file data structure.

3. The computer-implemented method of claim 2 further comprising:

deleting the original file data structure from the file system.

4. The computer-implemented method of claim 2, wherein the metadata comprises:

a date of creation of the original file;
a date of last modification of the original file;
ownership information of the original file; and
access permissions of the original file.

5. The computer-implemented method of claim 2 further comprising:

creating first and second directory entries in the file system corresponding to the first and second new file data structures, respectively; and removing a directory entry corresponding to the original file data structure from the file system.

6. The computer-implemented method of claim 5 further comprising:

adding, to the file system, a directory entry corresponding to the merge file data structure;

removing, from the file system, the directory entries corresponding to the first and second new file data structures; and deleting the first and second new file data structures.

7. The computer-implemented method of claim 1 further comprising:

accessing the first file data storage block of the original file by referring to the first new file data structure.

8. A computer-implemented method comprising:

splitting an original file comprising first and second file data storage blocks, said splitting comprising:

creating a first new file data structure corresponding to a first new file and a second new file data structure corresponding to a second new file, wherein the first new file data structure comprises an offset pointer and length of file information corresponding to a number of pointers in an original file data structure referenced by the first new file data structure, coupling the first and second new file data structures to the respective first and second file data storage blocks of the original file, wherein the first and second file data storage blocks are not replicated during said coupling, and the original file comprises the original file data structure and data written to the first and second file data storage blocks on a file system memory space, generating the offset pointer to a pointer to the first data storage block, wherein the pointer to the first data storage block is within the original file data structure, and storing the first and second new files on a memory device managed by a file system, wherein the creating, the coupling, and the storing are performed by a processor implementing the file system; and merging the first and second new file data structures, wherein the merging comprises:

coupling a merge file data structure to the first and second file data storage blocks, generating a first merge pointer to the first file data storage block, generating a second merge pointer to the second file data storage block, and including the first and second merge pointers in the merge file data structure.

9. The computer-implemented method of claim 8, wherein a file data structure of one or more of the first and second new file data structures and the original file data structure comprises:

one of an inode and a New Technology File System (NTFS) file attribute.

10. The computer-implemented method of claim 8 further comprising:

including an identifier to the original file data structure in the first new file data structure.

11. The computer-implemented method of claim 8 further comprising:

creating first and second directory entries, in the file system, corresponding to the first and second new file data structures, respectively.

12. The computer-implemented method of claim 11 further comprising:

merging the first and second new file data structures, wherein the merging comprises:

adding a directory entry to the file system corresponding to the original file data structure; and removing, from the file system, the directory entries corresponding to the first and second new file data structures.

13. The computer-implemented method of claim 8 further comprising:

accessing the first file data storage block of the original file by referring to the first new file data structure.

14. A computer-readable storage medium storing instructions, executable by a processor, said instructions comprising:

a first set of instructions configured to split an original file comprising first and second file data storage blocks, said first set of instructions further comprising:

a creation set of instructions configured to create a first new file data structure corresponding to a first new file and a second new file data structure corresponding to a second new file, wherein the first new file data structure comprises a plurality of pointers to respective file data storage blocks of the original file,
a coupling set of instructions configured to couple the first and second new file data structures to the respective first and second file data storage blocks of the original file, wherein
the first and second file data storage blocks are not replicated during said coupling, and
the original file comprises the original file data structure and data written to the first and second file data storage blocks on a file system memory space,
a generating set of instructions configured to generate a first pointer of the plurality of pointers to the first file data storage block of the original file; and
a second set of instructions configured to merge the first and second new file data structures, wherein the second set of instructions further comprises:
a second coupling set of instructions configured to couple a merge file data structure to the first and second file data storage blocks,
a second generating set of instructions configured to generate a first merge pointer to the first file data storage block,
a third generating set of instructions configured to generate a second merge pointer to the second file data storage block, and
an including set of instructions configured to include the first and second merge pointers in the merge file data structure.

15. The computer readable storage medium of claim 14 storing further instructions comprising:
a third set of instructions configured to copy metadata from the original file data structure to the first new file data structure.

16. The computer readable storage medium of claim 15 storing further instructions comprising:
a fourth set of instructions configured to delete the original file data structure from the file system.

17. The computer readable storage medium of claim 15 wherein the metadata comprises:
a date of creation of the original file;
a date of last modification of the original file;
ownership information of the original file; and
access permissions of the original file.

18. The computer readable storage medium of claim 15 storing further instructions comprising:
a fourth set of instructions configured to create first and second directory entries, in the file system, corresponding to the first and second new file data structures, respectively; and
a fifth set of instructions configured to remove, from the file system, a directory entry corresponding to the original file data structure.

19. The computer readable storage medium of claim 18 storing further instructions comprising:
a sixth set of instructions configured to add to the file system a directory entry corresponding to the merge file data structure;
a seventh set of instructions configured to remove, from the file system, the directory entries corresponding to the first and second new file data structures; and
an eighth set of instructions configured to delete the first and second new file data structures.

20. The computer readable storage medium of claim 14 storing further instructions comprising:

a third set of instructions configured to access the first file data storage block of the original file by referring to the first new file data structure.

21. A computer readable storage medium storing instructions, executable by a processor, said instructions comprising:
a first set of instructions configured to split an original file comprising first and second file data storage blocks, said first set of instructions further comprising:
a creation set of instructions configured to create a first new file data structure corresponding to a first new file and a second new file data structure corresponding to a second new file, wherein the first new file data structure comprises an offset pointer and length of file information corresponding to a number of pointers in an original file data structure referenced by the first new file data structure,
a coupling set of instructions configured to couple the first and second new file data structures to the respective first and second file data storage blocks of the original file, wherein
the first and second file data storage blocks are not replicated during said coupling, and
the original file comprises the original file data structure and data written to the first and second file data storage blocks on a file system memory space,
a generating set of instructions configured to generate an offset pointer to a pointer to the first data storage block, wherein the pointer to the first data storage block is within the original file data structure, and
a second set of instructions configured to merge the first and second new file data structures, said second set of instructions further comprising:
a second coupling set of instructions configured to couple a merge file data structure to the first and second file data storage blocks,
a second set of generating instructions configured to generate a first merge pointer to the first file data storage block,
a third set of generating instructions configured to generate a second merge pointer to the second file data storage block, and
an including set of instructions configured to include the first and second merge pointers in the merge file data structure.

22. The computer program product of claim 21 wherein a file data structure of one or more of the first and second new file data structures and the original file data structure comprises:
one of an inode and a New Technology File System (NTFS) file attribute.

23. The computer readable storage medium of claim 21 storing further instructions comprising:
a third set of instructions configured to include an identifier to the original file data structure in the first new file data structure.

24. The computer readable storage medium of claim 21 storing further instructions comprising:
a third set of instructions configured to create first and second directory entries in the file system corresponding to the first and second new file data structures, respectively.

25. The computer readable storage medium of claim 24 storing further instructions comprising:
a fourth set instructions configured to add a directory entry to the file system corresponding to the original file data structure; and a fifth set instructions configured to remove the directory entries corresponding to the first and second new file data structures.

26. The computer readable storage medium of claim 21 storing further instructions comprising:
a third set of instructions configured to access the first file data storage block of the original file by referring to the first new file data structure.

27. An apparatus comprising:
means for splitting an original file comprising first and second file data storage blocks, said means for splitting comprising:
means for creating a first new file data structure corresponding to a first new file and a second new file data structure corresponding to a second new file, wherein the first new file data structure comprises a plurality of pointers to respective file data storage blocks of the original file,
means for coupling the first and second new file data structures to the respective first and second file data storage blocks of the original file, wherein
the first and second file data storage blocks are not replicated during said coupling, and
the original file comprises the original file data structure and data written to the first and second file data storage blocks on a file system memory space,
means for generating a first pointer of the plurality of pointers to the first file data storage block of the original file, and
means for merging the first and second new file data structures, wherein the means for merging comprises:
means for coupling a merge file data structure to the first and second file data storage blocks,
means for generating a first merge pointer to the first file data storage block,
means for generating a second merge pointer to the second file data storage block, and
means for including the first and second merge pointers in the merge file data structure.

28. The apparatus of claim 27 further comprising:
means for copying metadata from the original file data structure to the first new file data structure.

29. The apparatus of claim 28 further comprising:
means for deleting the original file data structure from the file system.

30. The apparatus of claim 28, wherein the metadata comprises:
a date of creation of the original file;
a date of last modification of the original file;
ownership information of the original file; and
access permissions of the original file.

31. The apparatus of claim 28 further comprising:
means for creating first and second directory entries in the file system corresponding to the first and second new file data structures, respectively; and
means for removing a directory entry corresponding to the original file data structure from the file system.

32. The apparatus of claim 31 further comprising:
means for adding a directory entry to the file system corresponding to the merge file data structure;
means for removing the directory entries corresponding to the first and second new file data structures; and means for deleting the first and second new file data structures.

33. The apparatus of claim 27 further comprising:
means for accessing the first file data storage block of the original file by referring to the first new file data structure.

34. An apparatus comprising:
means for splitting an original file comprising first and second file data storage blocks, said means for splitting comprising:
means for creating a first new file data structure corresponding to a first new file and a second new file data structure corresponding to a second new file, wherein the first new file data structure comprises an offset pointer and length of file information corresponding to a number of pointers in an original file data structure referenced by the first new file data structure,
means for coupling the first and second new file data structures to the respective first and second file data storage blocks of the original file, wherein
the first and second file data storage blocks are not replicated during said coupling, and
the original file comprises the original file data structure and data written to the first and second file data storage blocks on a file system memory space,
means for generating the offset pointer to a pointer to the first data storage block, wherein
the pointer to the first data storage block is within the original file data structure; and
means for merging the first and second new file data structures, wherein the means for merging comprises:
means for coupling a merge file data structure to the first and second file data storage blocks,
means for generating a first merge pointer to the first file data storage block,
means for generating a second merge pointer to the second file data storage block, and
means for including the first and second merge pointers in the merge file data structure.

35. The apparatus of claim 34, wherein a file data structure of one or more of the first and second new file data structures and the original file data structure comprises:
one of an inode and a New Technology File System (NTFS) file attribute.

36. The apparatus of claim 34 further comprising:
means for including an identifier to the original file data structure in the first new file data structure.

37. The apparatus of claim 34 further comprising:
means for creating first and second directory entries in the file system corresponding to the first and second new file data structures, respectively.

38. The apparatus of claim 37 further comprising:
means for adding a directory entry to the file system corresponding to the original file data structure; and
means for removing the directory entries corresponding to the first and second new file data structures.

39. The apparatus of claim 34 further comprising:
means for accessing the first file data storage block of the original file by referring to the first new file data structure.

* * * * *